United States Patent
Kim

(10) Patent No.: US 7,905,387 B2
(45) Date of Patent: Mar. 15, 2011

(54) METHOD OF MANUFACTURING EXPANSION JOINT

(75) Inventor: Yong Woo Kim, Seoul (KR)

(73) Assignee: Yong Woo Kim, Seoul (KR)

( * ) Notice: Subject to any disclaimer, the term of this patent is extended or adjusted under 35 U.S.C. 154(b) by 197 days.

(21) Appl. No.: 11/975,785

(22) Filed: Oct. 22, 2007

(65) Prior Publication Data

US 2008/0105732 A1    May 8, 2008

(30) Foreign Application Priority Data

Oct. 26, 2006   (KR) .......................... 10-2006-0104321

(51) Int. Cl.
*B23K 31/02*    (2006.01)
(52) U.S. Cl. ...................................... 228/155; 228/141.1
(58) Field of Classification Search .................. 228/155, 228/141.1
See application file for complete search history.

(56) References Cited

U.S. PATENT DOCUMENTS 3,263,054 A * 7/1966 Holmgren ................... 219/60 R

FOREIGN PATENT DOCUMENTS

JP    11320185 A  * 11/1999

OTHER PUBLICATIONS

Machine Translation of JP 11320185 A published Nov. 1999, acquired Oct. 2009.*

* cited by examiner

*Primary Examiner* — Jessica L Ward
*Assistant Examiner* — Nicholas P D'Aniello
(74) *Attorney, Agent, or Firm* — Rader Fishman Grauer

(57) ABSTRACT

A method of manufacturing an expansion joint includes steps of: marking parts, which will form the expansion joint, on a piece of raw material, so that the original 360 degree shape of the expansion joint is equally divided by the parts, and cutting the marked parts from the raw material; welding the divided parts, so that opposing ends of the welded parts are separated from each other; bending the welded parts into the form of a cone using a bending roller, thereby welding and joining the opposing ends thereof; fixedly mounting the resultant structures on a press; shaping the mounted resultant structures into products using a mold having a desired shape and dimension; and butting a pair of the products against each other and welding the products in the outer radial direction.

1 Claim, 3 Drawing Sheets

METHOD OF MANUFACTURING EXPANSION JOINT

BACKGROUND OF THE INVENTION

1. Field of the Invention

The present invention relates to a method of manufacturing an expansion joint, and more particularly, to a method of manufacturing an expansion joint, which is used in a fixed-plate heat exchanger. The method of manufacturing the present invention can carry out shaping in the outer radial direction at room temperature, so that physical properties are not changed, thereby ensuring sufficient stability against internal pressure and stress caused by contraction, saving raw material and reducing manufacturing cost.

2. Description of the Related Art

FIG. 1 is a process view sequentially illustrating a conventional process of manufacturing an expansion joint. The conventional process of manufacturing an expansion joint includes a marking and cutting procedure S100 of marking raw material and cutting the raw material along the marking, a shaping procedure S110 of shaping the outside portion of a product according to a desired shape and dimensions using a spinning machine (lathe, a marking and cutting procedure S120 of marking the inside portion of the product, the outside portion of which is formed, and cutting the product along the marking, and a shaping procedure S130 of shaping the inside portion of the product according to a desired shape and dimension using the spinning machine. The conventional manufacturing process also includes a welding procedure S140. In the welding procedure, two products, which are obtained through the above procedures, are butted against each other and welded in the outer radial direction, so that an expansion joint is finally manufactured.

However, the conventional manufacturing process has drawbacks as follows: Since the rectangular raw material is circularly marked and cut so that the product can be manufactured at room temperature using a mold and a hydraulic press, the rest is discarded as scrap. This is a factor increasing the overall manufacturing cost. Since the outside portion is shaped by the spinning machine, it is possible only to process raw materials having a thickness up to 25 mm, thereby failing to ensure the reliability of the product. In particular, since marking is performed on the inside portion of the product in a state where the outside portion of the product is shaped, shaping time is increased and productivity is lowered. This increases the need for manpower and thus the labor cost, thereby raising the cost of the product.

SUMMARY OF THE INVENTION

The present invention has been made to solve the foregoing problems with the prior art, and therefore an object of the present invention is to provide a method of manufacturing an expansion joint, which can carry out shaping in the outer radial direction at room temperature, so that physical properties are not changed, thereby ensuring sufficient stability against internal pressure and stress, caused by contraction, which can be made from raw material having a thickness of up to 75 mm, thereby ensuring the reliability of products, and which can minimize waste, thereby saving raw material and reducing manufacturing costs.

According to an aspect of the present invention for realizing the object, the present invention provides a method of manufacturing an expansion joint. The manufacturing method includes steps of marking parts, which will form the expansion joint, on a raw material, so that the 360 degree original shape of the expansion joint is equally divided by the parts, and cutting the marked parts from the raw material; welding the divided parts, so that opposing ends of the welded parts are separated from each other; bending the welded parts into the form of a cone using a bending roller, thereby welding and joining the opposing ends thereof; fixedly mounting the resultant structures on a press; shaping the mounted resultant structures into products using a mold having a desired shape and dimension; and butting a pair of the products against each other and welding the products in the outer radial direction.

According to the present invention as set forth above, the expansion joint can be shaped in the outer radial direction at room temperature, so that physical properties are not changed, thereby achieving sufficient stability against internal pressure and stress caused by contraction. The expansion joint can also be processed with a raw material having a thickness up to 75 mm, thereby ensuring the reliability of products. Furthermore, the expansion joint can minimize waste, thereby saving raw material and reducing manufacturing costs.

DETAILED DESCRIPTION OF THE INVENTION

Hereinafter the present invention will be described more fully in conjunction with the accompanying drawings, in which an exemplary embodiment of the present invention is shown.

Figure 1:
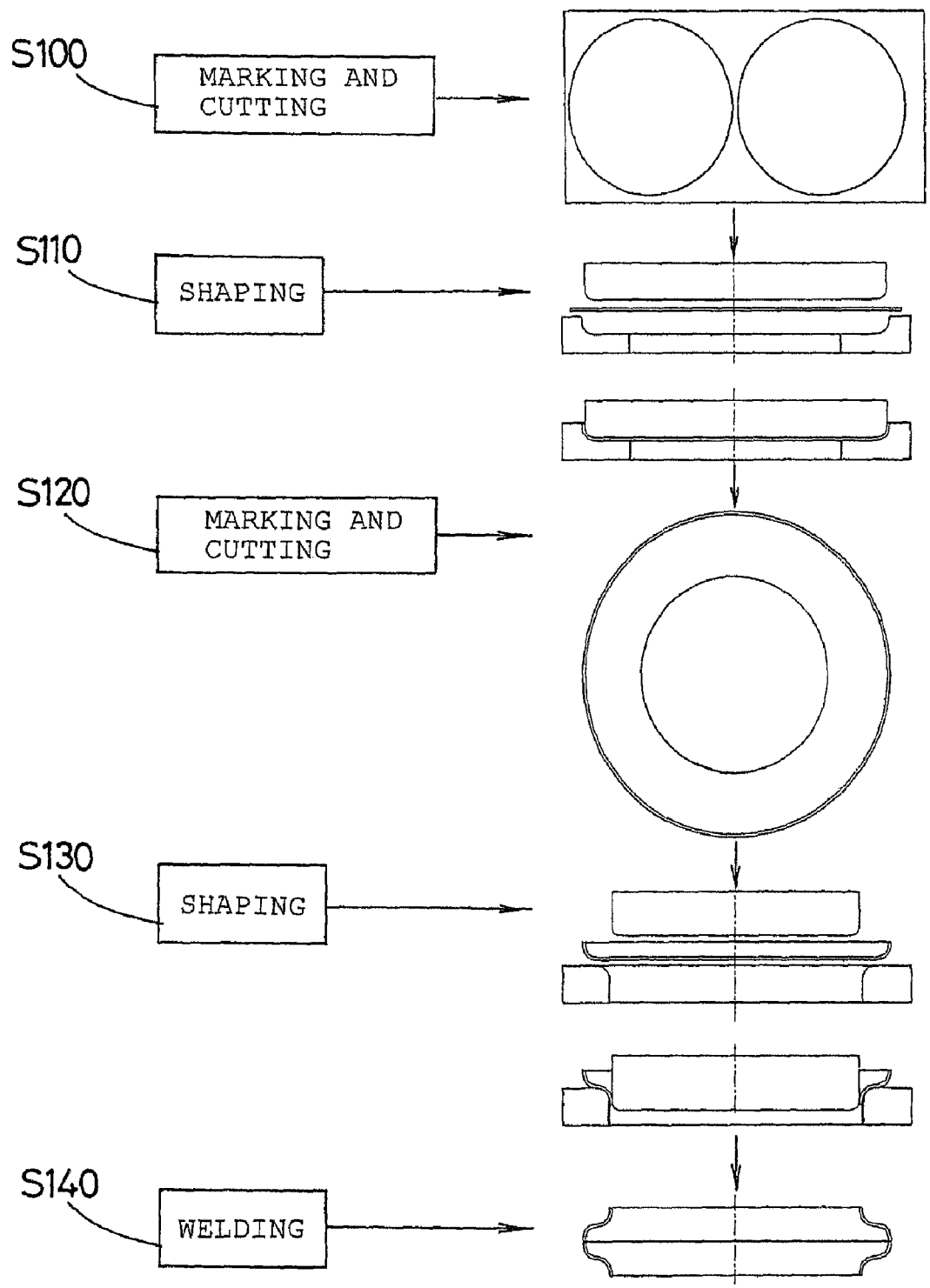
FIG. 1 is a process view sequentially illustrating a conventional process of manufacturing an expansion joint.
Figure 2:
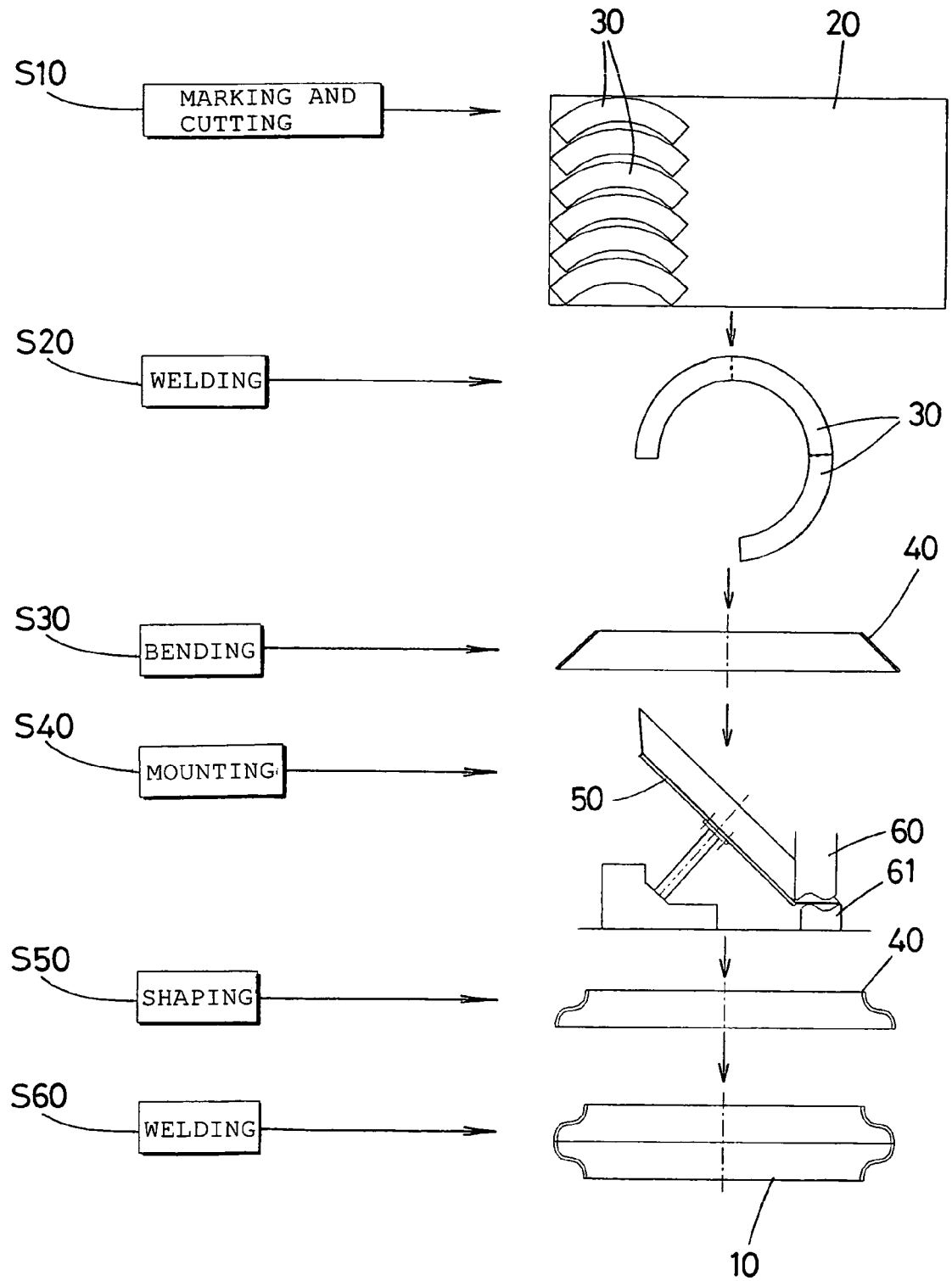
FIG. 2 is a process view sequentially illustrating a process of manufacturing an expansion joint of the present invention.

FIG. 2 is a process view sequentially illustrating the process of manufacturing an expansion joint of the present invention. As shown in FIG. 1, the process of manufacturing an expansion joint of the present invention can manufacture an expansion joint 10 from raw material 20 having a thickness of up to 75 mm.

In a marking and cutting procedure S10, parts 30, which will form the expansion joint 20, are marked on a piece of raw material 20, so that the 360 degree original shape of the expansion joint 10 is equally divided into the parts 30, and the marked parts 30 are cut from the raw material 20.

In a welding procedure S20, after the respective parts 30 are cut from the raw material, the parts 30 are brought into contact with each other and are welded together, such that adjoining or opposing ends of the respective parts 30 are separated from each other, so that a cone shape can be formed later.

In a bending procedure S30, the welded parts 30 are bent and welded into the shape of a cone using a bending roller (not shown), so that the opposing ends are joined.

In a mounting procedure S40, a fixing plate 50 is fixed to the inside edge of a product 40, which is in the shape of a cone, by bending and welding, so that the product is mounted on a press (not shown). In a shaping procedure S50, the product is shaped using upper and lower molds 60 and 61, which have a desired shape and dimension. When the product 40 is heated, it is differently heated according to the physical properties of the raw material. That is, the product 40 is heated at room temperature if the raw material is thin. If the raw material is thick, the product 40 is heated using propane gas, a torch or an electric device, and is slowly rotated during the heating in order to facilitate the heating.

Figure 3:
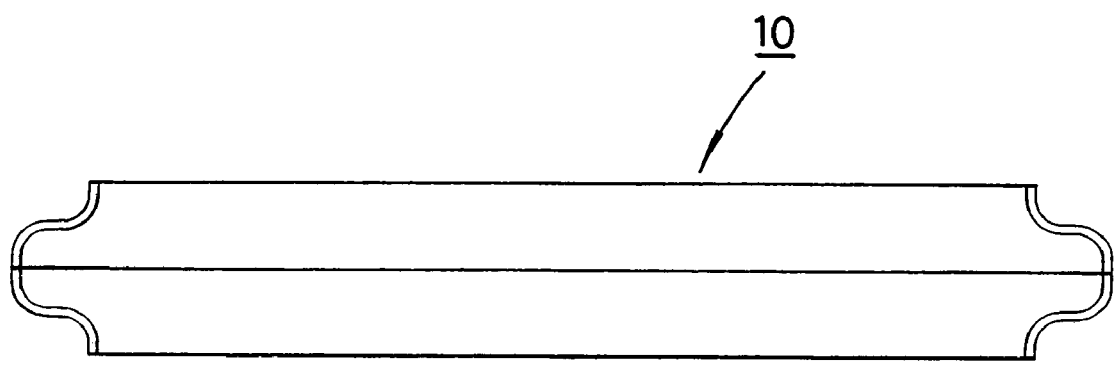
FIG. 3 is a cross-sectional view illustrating an expansion joint, which is finally manufactured by the manufacturing process shown in FIG. 2.

Then, in a welding procedure S60, a pair of the shaped products 40 is welded in the outer radial direction, thereby finally producing the expansion joint 10, as shown in FIG. 3.

As set forth above, the present invention can reduce the size of the molds, unlike the prior art, so that economic efficiency can be improved and manufacturing time can be remarkably reduced.

According to the present invention as set forth above, the expansion joint can be shaped in the outer radial direction at room temperature, so that physical properties are not changed, thereby achieving sufficient stability against internal pressure and stress caused by contraction. The expansion joint can also be processed with a raw material having a thickness up to 75 mm, thereby ensuring the reliability of products. Furthermore, the expansion joint can minimize waste, thereby saving raw material and reducing manufacturing costs.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of manufacturing an expansion joint, comprising marking parts, which will form the expansion joint on a piece of raw material, so that a 360 degree original shape of an expansion joint is equally divided into the marked parts, and cutting the marked parts from the raw material to obtain divided parts;

welding the divided parts together, so that opposing ends of the welded part are separated from each other, to obtain welded parts bending the welded parts in a shape of a cone using a bending roller, thereby welding and joining the opposing ends thereof to obtain a cone shape product;

fixing the inside edge of the cone shaped structure on a fixing plate and mounting the cone shaped structure and the fixing plate on a press;

shaping the mounted cone shaped structure on the press into a first shaped product by rotating the cone shaped structure between upper and lower molds having the desired shape and dimension;

repeating all of the previous steps to form a second shaped product; and butting the first and second the shaped products against each other and welding the first and second shaped products together in an outer radial direction to produce the expansion joint.

\* \* \* \* \*